(12) United States Patent
Mecozzi

(10) Patent No.: US 9,677,782 B1
(45) Date of Patent: *Jun. 13, 2017

(54) FAN SYSTEM COMPRISING FAN ARRAY WITH SURGE CONTROL

(71) Applicant: ClimateCraft, Inc., Oklahoma City, OK (US)

(72) Inventor: Walter P. Mecozzi, Edmond, OK (US)

(73) Assignee: ClimateCraft, Inc., Oklahoma City, OK (US)

( * ) Notice: Subject to any disclaimer, the term of this patent is extended or adjusted under 35 U.S.C. 154(b) by 108 days.

This patent is subject to a terminal disclaimer.

(21) Appl. No.: 14/251,620

(22) Filed: Apr. 13, 2014

Related U.S. Application Data

(63) Continuation of application No. 12/608,074, filed on Oct. 29, 2009, now Pat. No. 8,814,639.

(60) Provisional application No. 61/109,363, filed on Oct. 29, 2008.

(51) Int. Cl.
- *F04D 25/16* (2006.01)
- *F24F 7/06* (2006.01)
- *F24F 11/04* (2006.01)

(52) U.S. Cl.
CPC ............ *F24F 11/04* (2013.01); *F04D 25/166* (2013.01); *F24F 7/06* (2013.01)

(58) Field of Classification Search
CPC .. F24F 7/00; F24F 13/20; F24F 11/001; F24F 13/10; F24F 11/0038; F24F 7/06; F04B 49/08; F42F 2011/0038; F42F 2011/0041; F42F 2011/0042; F03B 3/12; F04D 15/02; F04D 15/0245; F04D 15/029; F04D 25/166

USPC .............. 454/256; 417/3–5, 42; 415/119
See application file for complete search history.

(56) References Cited

U.S. PATENT DOCUMENTS

| | | | | |
|---|---|---|---|---|
| 3,398,880 | A * | 8/1968 | Wallin | F04D 25/16 415/119 |
| 3,664,129 | A * | 5/1972 | Schwab | F01P 7/044 137/468 |
| 4,011,735 | A * | 3/1977 | Martz | F04D 27/003 165/286 |
| 4,135,854 | A * | 1/1979 | Binstock | F04D 27/002 415/48 |

(Continued)

FOREIGN PATENT DOCUMENTS

JP          63223396 A  *  9/1988

*Primary Examiner* — Steven B McAllister
*Assistant Examiner* — Francis F Hamilton
(74) *Attorney, Agent, or Firm* — Mary M. Lee

(57) ABSTRACT

A fan system for a variable air volume heating and/or air conditioning unit comprising a fan array with a control system to eliminate surge at low operating flows and to maximize operating range. The fan control system includes a fan pressure sensor for determining the pressure rise across the fan array and a fan airflow sensor for determining the total airflow generated by the fan array. A surge controller is programmed to constantly monitor the calculated surge pressure as the fan speed control is modulating the fan speed in response to user demands. As airflow increases or decreases in response to changes in fan speed, so will the calculated surge pressure. The surge control turn fans on and off to ensure that the operating fans are running in their optimum fan speed ranges. Thus, the fans in the fan array are prevented from reaching the surge point.

12 Claims, 12 Drawing Sheets

(56) References Cited

U.S. PATENT DOCUMENTS

| | | | | |
|---|---|---|---|---|
| 4,255,089 A * | 3/1981 | Phillips, Jr. | F04D 27/00 | 417/17 |
| 4,553,404 A * | 11/1985 | Malchow | F24F 1/027 | 415/148 |
| 4,706,553 A * | 11/1987 | Sharp | B08B 15/023 | 454/61 |
| 4,929,150 A * | 5/1990 | Daw | F04D 27/002 | 415/157 |
| 5,161,941 A * | 11/1992 | Ratner | F04D 29/464 | 415/150 |
| 5,422,550 A * | 6/1995 | McClanahan | H02P 5/50 | 318/103 |
| 5,586,861 A * | 12/1996 | Berger | F04D 27/00 | 415/118 |
| 5,586,932 A * | 12/1996 | Kiser | F24F 3/044 | 126/110 AA |
| 5,707,005 A * | 1/1998 | Kettler | F24F 3/044 | 236/49.3 |
| 5,743,715 A * | 4/1998 | Staroselsky | F04D 27/02 | 415/1 |
| 5,827,044 A * | 10/1998 | Yazici | F04D 29/4213 | 415/131 |
| 5,950,653 A * | 9/1999 | Folsom | E03B 7/12 | 137/115.13 |
| 6,186,744 B1 * | 2/2001 | Wolochuk | F04D 27/001 | 417/44.2 |
| 6,397,878 B1 * | 6/2002 | Nolan | E03C 1/106 | 137/218 |
| 2005/0180846 A1 * | 8/2005 | Hopkins | F04D 25/166 | 415/119 |
| 2005/0232753 A1 * | 10/2005 | Hopkins | F04D 25/166 | 415/119 |
| 2008/0264086 A1 * | 10/2008 | Liu | F24F 11/0079 | 62/180 |
| 2008/0279677 A1 * | 11/2008 | Hopkins | F04D 25/166 | 415/51 |

* cited by examiner

FAN SYSTEM COMPRISING FAN ARRAY WITH SURGE CONTROL

CROSS-REFERENCE TO RELATED APPLICATIONS

This is a continuation of co-pending application Ser. No. 12/608,074, entitled "Fan System Comprising Fan Array with Surge Control," filed Oct. 29, 2009, which claims the benefit of the filing date of provisional application No. 61/109,363, filed Oct. 29, 2008, entitled "Fan Array with Surge Control," and the contents of these prior applications are incorporated herein by reference.

FIELD OF THE INVENTION

The present invention relates generally to air handling or air delivery systems for heating, ventilation and air conditioning ("HVAC") systems and, more particularly but without limitation, to devices for control the surge effect in systems comprising fan arrays.

BACKGROUND OF THE INVENTION

Modern fans systems used in commercial structures that employ variable air volume duct distribution systems and use fan speed controls to reduce the duct pressure and airflow during low load periods are highly efficient but have a limited range of operation. The minimum flow is usually determined by the surge effect of the fans. This effect can reduce the range of operation and potentially reduce the power savings available at reduced flow.

With the increasing popularity of fan array systems that employ two or more fans operating in parallel, it is possible to extend the minimum range of a fan array system by switching off one or more of the fans in an array as they are about to go into surge thereby allowing the fans that remain operating to move away from their surge point and supply lower flow than would be possible otherwise. This invention addresses how to control an array of fans to avoid the surge effect and enable the array of fans to operate at lower flows and lower power levels than would be otherwise possible.

FIG. 1 is a schematic illustration of an air handling system of the type commonly referred to as a "variable air volume" system or a "VAV" system designated generally by the reference numeral 100. Most modern air conditioning systems on large commercial systems employ large air handlers to control the inside air conditions in multiple zones $Z_1$-$Z_4$ or rooms in the structure. Because the heating and or cooling loads in each of these zones are independent and variable it is desirable to provide individual control in each zone. A large air handler 102 is connected to a supply air distribution system of ductwork designated generally at 104.

Variable air volume boxes 106 are installed in the ductwork to control the airflow to a plurality of zones in the building served by the fans 108 in the air handler 102. Each of the variable air volume boxes 106 has an air control damper built into it. The damper is used to throttle the air flow going to the zone. In this way, one air handler can serve several zones in the building and maintain good temperature control in each of those zones.

In this type of system, a duct pressure controller 114 senses supply duct pressure and controls the fan speed accordingly. The pressure controller 114 sends control signals to the fan speed control 116 to maintain a set pressure in the duct. The speed controller then changes the fan running speed in order to accomplish this. If the majority of the variable air volume boxes 106 open up, the pressure in the duct will fall, and the duct pressure control system will increase the speed of the fans 108 to compensate. Likewise, if the majority of the boxes close up, the duct pressure will tend to rise and the duct pressure control system will slow the fan speed. The pressure in the supply duct will then be constant and allow the dampers in the variable air volume boxes 106 to operate in a relative stable manner. This control pressure, in effect, sets a minimum distribution system pressure loss.

The distribution system 104 is only part of the pressure loss that the fan 108 must overcome. Cooling coils 120, heating coils 122, and filters 124, as well as dampers, louvers, and other items not shown, provide resistance to air flow in the form of pressure loss. These losses typically vary with the square of the air flow through those devices. At design (maximum) flow, these other losses typically are a large part of the pressure loss the fans 108 must overcome. Because these losses are falling off with the square of the flow, they reduce rapidly as the flow is reduced. For example, at twenty-five percent (25%) of design flow, these losses are only six and one-fourth percent (6.25%) of their design value, and they become a small part of the pressure loss that the fans 108 must overcome. FIG. 2 shows a typical flow resistance curve in a modern VAV system.

Centrifugal fans are commonly used in air handling systems because they are highly efficient, compact, and are easy to apply. As the system flow resistance is increased on a centrifugal fan, the flow will decrease and the pressure will rise. At a certain point of pressure and flow, the fan will go into surge. Surge is a well known condition in fans; it is the point where the fan blades experience flow separation similar to the phenomena known as stall on an aircraft wing. The combination of pressure and flow at which a fan goes into surge is a function of the operating speed and can be determined easily by test. Fan manufacturers publish data that defines when a fan will go into surge. This data can be defined in the form of a constant, $K_s$, for use in the following equation:

$$SP_{surge} = K_s \times CFM^2$$

When the pressure is higher than $SP_{surge}$ for any given flow, the fan is in surge. When a fan goes into surge, it produces pressure pulsations that can cause duct rumble, noise, and excessive vibration. If the fan(s) operate in surge, these pulsations can cause damage to the duct distribution system, the air handler, and the fan(s). It is important to avoid fan operation in surge. A plot of the fan surge pressure ($SP_{surge}$) verses fan airflow is known as the surge curve.

FIG. 3 shows the fan pressure delivery verses flow curves for three different fan speeds. The maximum speed is typically the design speed. This design speed is selected so that the fan(s) deliver the desired airflow at the expected system pressure. This is represented by the intersection of the system curve and the fan curve at design speed. This is typically the maximum flow of the fan(s). When less flow is required to meet the heating or cooling load in the building, the speed of the fan(s) is reduced. Reducing the fan speed changes the fan curve according to a relationship known as the Fan Laws, which state for any point on a fan curve:

$$Airflow_2 = Airflow_1 \times (Speed_2/Speed_1)$$

$$Pressure_2 = Pressure_1 \times (Speed_2/Speed_1)^2$$

This is illustrated by FIG. 3 where the three fan curves are labeled "Design Speed," "Reduced Speed," and "Min Speed." These are shown to represent three distinct operating conditions to illustrate the effect of lowering fan speed. The fan speed is infinitely variable between the maximum and the minimum.

Because of the need to maintain the control pressure, the fan(s) on a VAV system will go into surge when the flow is low enough. The flow at which the fan(s) go into surge is at the point where the VAV system's flow resistance curve intersects the fan surge curve. At lower flows the pressure will be higher than the surge pressure, and the fan(s) will be in surge. FIG. 3 also illustrates the point where fan(s) go into surge by plotting the surge curve on the same chart as the system resistance curve. This flow is commonly known as the surge point.

The surge point defines the minimum flow at which a VAV system can safely operate. The minimum flow of a given system is a function of the selection of fan size and the control pressure. Usually several different size fans can be selected to meet the flow and pressure requirements of a system. There will be an optimum size that results in the most efficient fan selection. If smaller fans are selected, they will run at higher speed and lower efficiency than the optimum selection. A larger (and more efficient) fan will have a higher flow at the surge point and will therefore have a more limited range of operation.

A higher control pressure will also result in a higher flow at the surge point for any fan selection. A typical VAV system will need to operate at flows as low as thirty to forty percent (30%-40%) of the design (maximum) flow. Often times the most efficient fan selection will result in a fan(s) that will only turn down to fifty to sixty percent (50%-60%) of design flow, which is not enough to satisfy the needed operating range of the building.

In order to decrease the flow at the surge point and increase the operating range of the system, designers often choose smaller and less efficient fans. While this accomplishes the goal of increasing the operating range of the system, it has other undesirable effects. Because the fans are less efficient, they consume more power. This increases energy consumption, peak electrical demand, and often the installed motor horsepower. This results in higher cost of installation and higher operating costs. When fans need to deliver less than thirty to forty percent (30%-40%) of design (maximum) flow, designers often add a flow bypass device to divert air flow around the fan(s) to accomplish this high turndown. This flow bypass substantially reduces the efficiency of the fan(s) when operating at low loads.

Fan arrays are becoming increasingly more popular in large commercial air handlers. Many of these air handlers are used on variable air volume (VAV) systems. A fan array is two or more fans operating in parallel to meet the needs of the air handling system. Often six or more fans are used in a fan array. Because of this plurality of fans, it is possible to increase the operating range of the fan array system by shutting off fans when the flow is reduced to the point where the fan array would go into surge. By shutting off a fan when the array is at or near the surge point, the remaining fans will be sped up by the duct pressure controller to maintain the required system flow. This will result in increased flow per fan, which drives those fans away from their surge point. If the building flow requirement continues to fall, additional fans can be shut off to the extent they are available to allow further flow reductions.

DETAILED DESCRIPTION OF THE PREFERRED EMBODIMENTS

The present invention provides an automatic method to control a fan array in a variable air volume system to cycle individual fan units on and off to extend the operating range of the fan array. Some prior art systems relied on manual control by the system operator. When the operator observed the fans going into surge, he could disconnect one or more of them to keep the system operating. Other systems rely on preprogrammed airflow settings to switch off fans; these program settings had to be experimentally determined after the unit was installed and required reprogramming if any changes were made to the operating settings of the building or structure of the air distribution system.

In accordance with the present invention, the most efficient fans can be selected for the fan array. In addition, the operating range of the fan array can be extended to meet the needs of the building by automatically cycling fans on and off as needed to reduce the flow. It does not require experimental work on the air handler after it is installed and will adapt to changing operating settings and conditions in the building.

This invention is directed to a fan system comprising a fan array. The array is a plurality of independently controlled fan units arranged to operate in parallel and installed in an air handling unit attached to a building structure. A speed controller, which can be a variable frequency drive, may be provided to allow the plurality of fan units to deliver the varying pressure and airflow required to meet the demand of the building structure. A fan control system preferably is included to cycle the fans off and on in a prescribed sequence, as the flow required is varied, in order to keep the fans from going into surge. Back flow prevention means may be provided to prevent air from flowing backwards through the fans that are cycled off.

Figure 1:
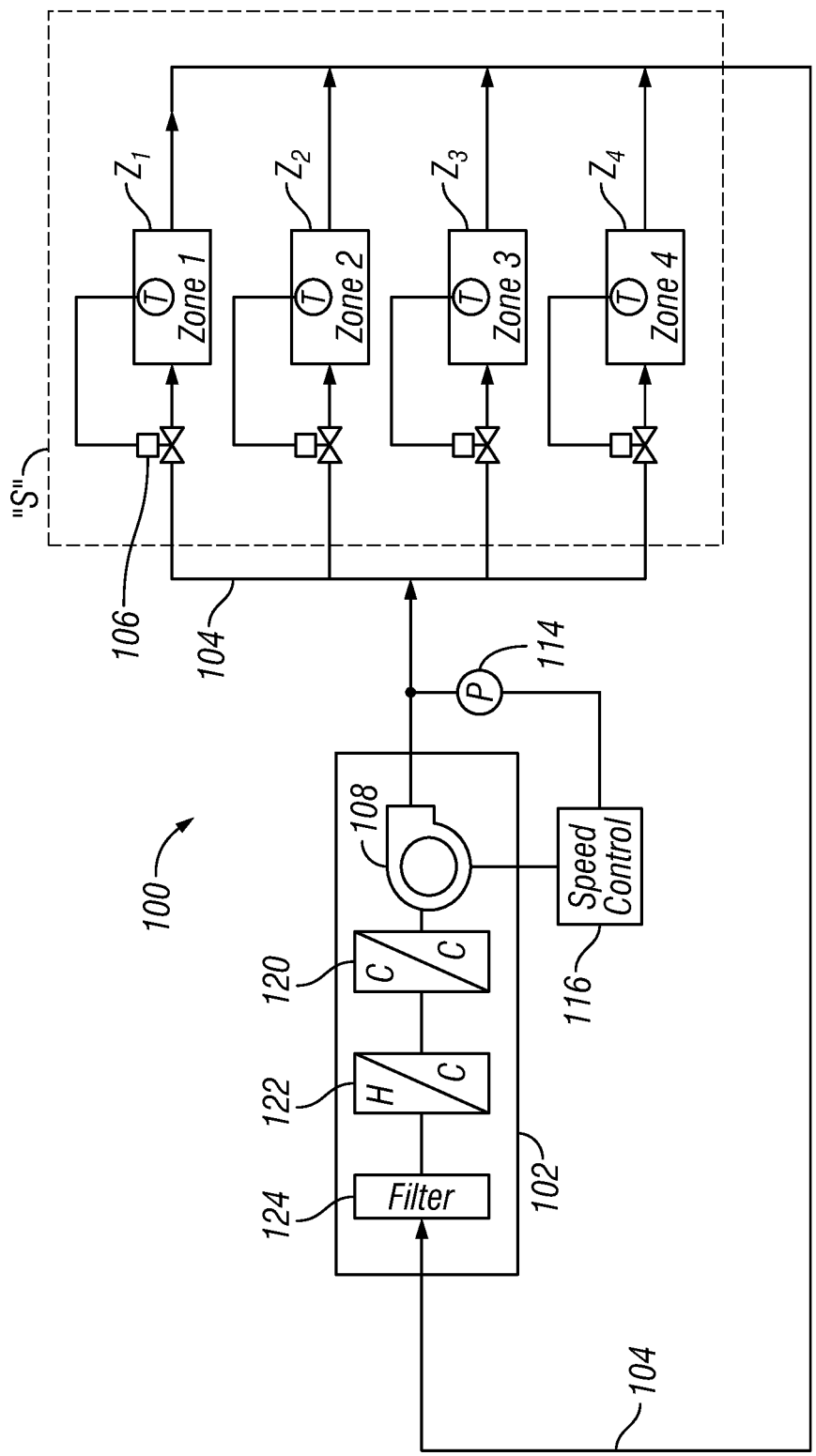
FIG. 1 is a schematic illustration of a prior art variable air volume air handling system for a multi-zone structure.
Figure 2:
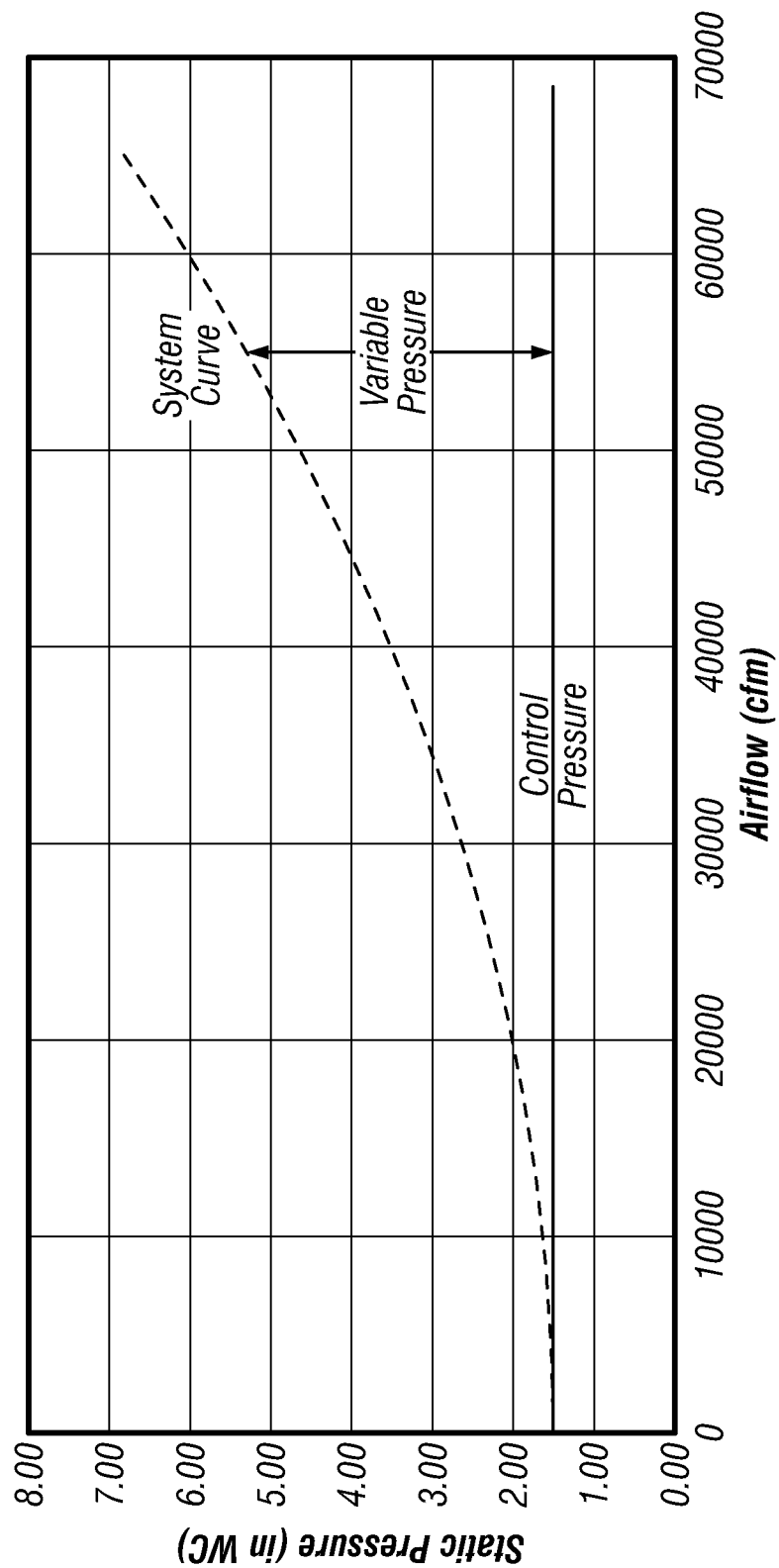
FIG. 2 shows a typical flow resistance curve in a modern VAV system.
Figure 3:
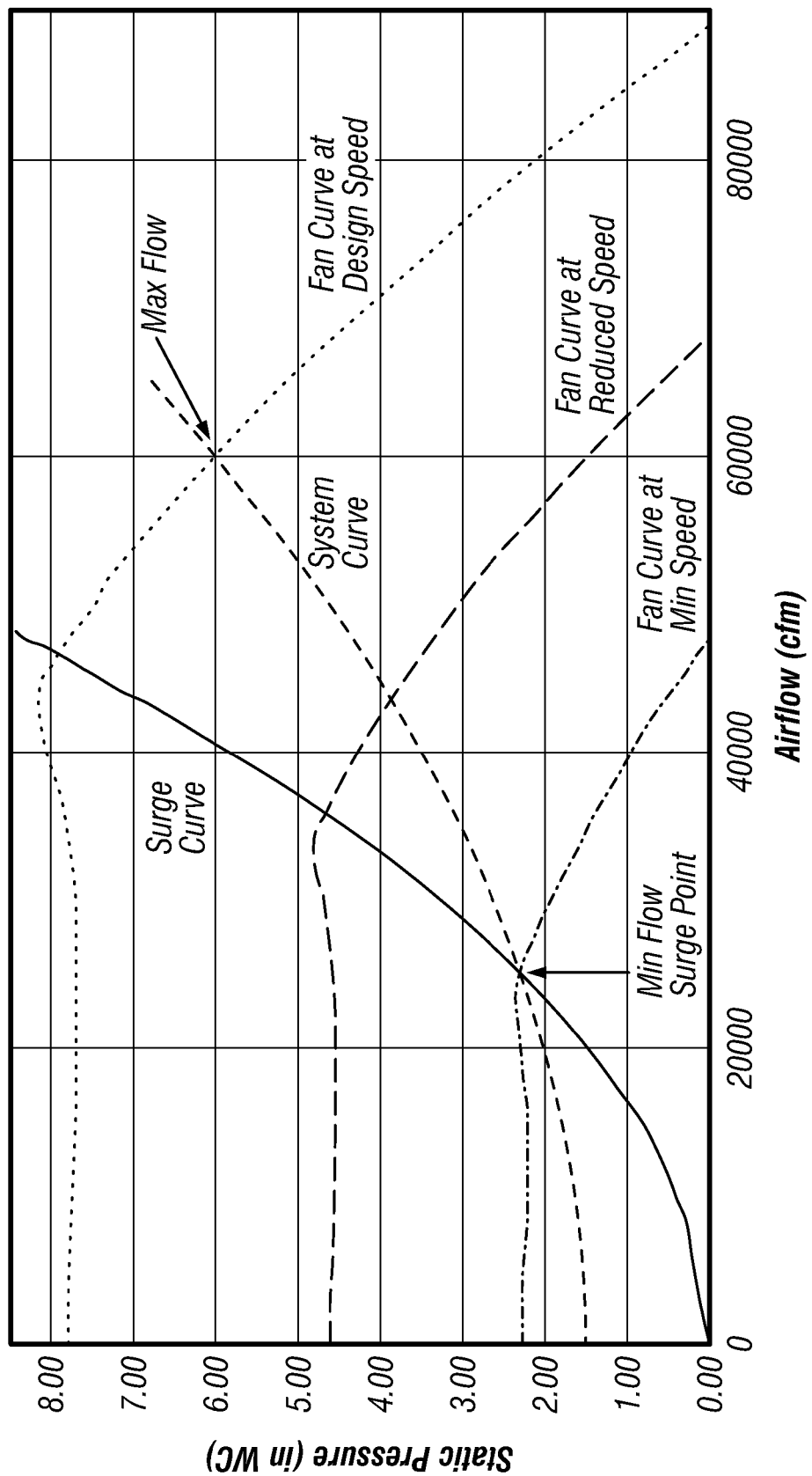
FIG. 3 shows fan pressure delivery versus flow curves for three different fan speeds.
Figure 4:
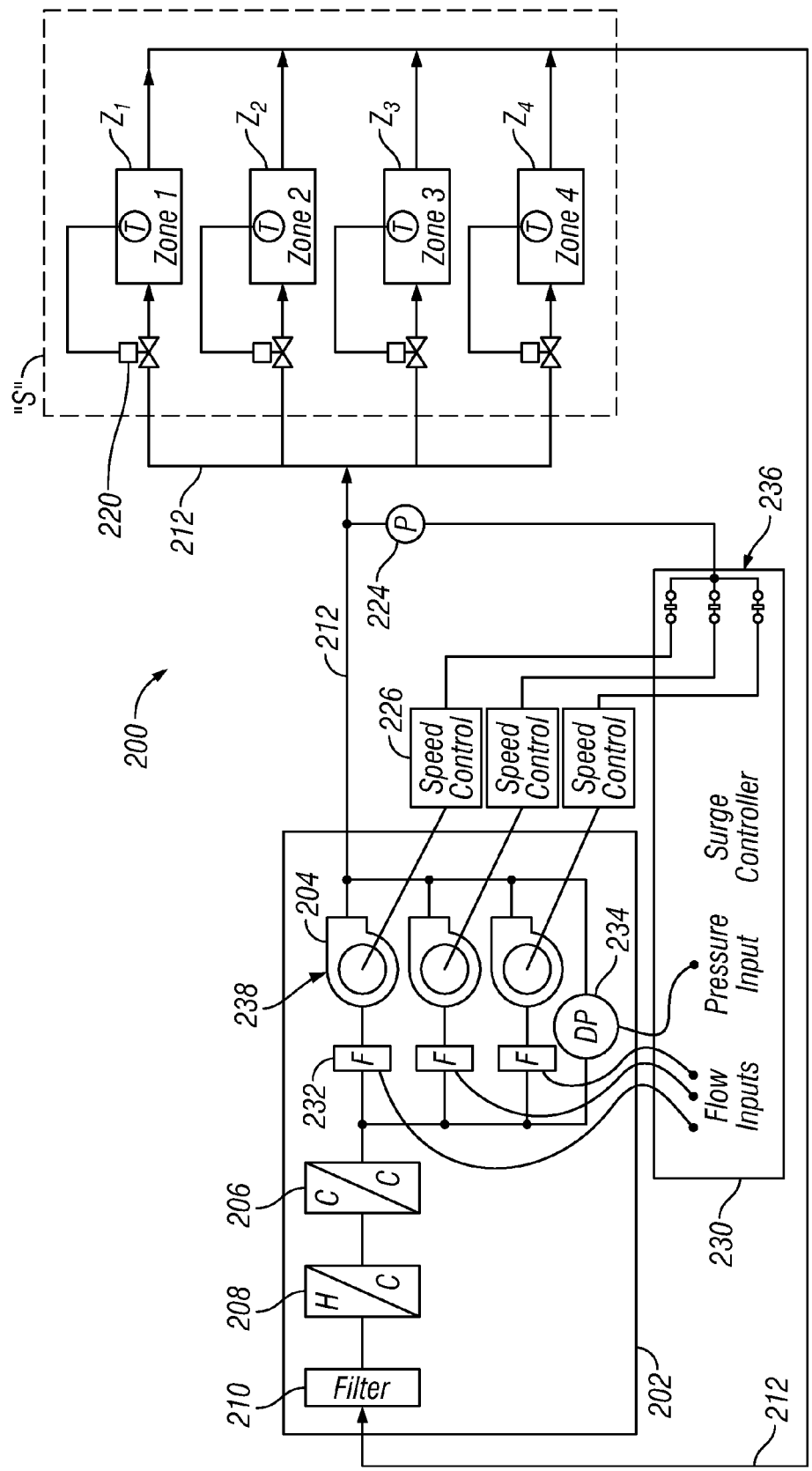
FIG. 4 is a schematic illustration of a variable air volume air handler system for a multi-zone structure comprising a fan system made in accordance with a first preferred embodiment of the present invention.

Turning now to FIG. 4, a preferred embodiment of the present invention will be described. The variable air volume system of the present invention is designated generally by the reference numeral 200. The system 200 comprises an air handler 202 comprising a fan array 204. The air handler may include other components, such as cooling coils 206, heating coils 208, and filters 210, as well as dampers, louvers, and other items not shown. Air from the air handler 202 is channeled to the various rooms or zones $Z_1$ to $Z_4$ in the structure "S" through a system of distribution ducts 212. In the duct supplying each zone $Z_1$ to $Z_4$, a variable air volume box 220 with a damper is installed.

The air handling system 200 preferably also comprises a duct pressure controller 224 and one or more fan speed controllers designated collectively at 226. The pressure controller 224 senses supply duct pressure and sends control signals to the fan speed controllers 226 to maintain a predetermined pressure in the duct system 212, as previously described. The fan speed controllers 226 may be variable frequency drives or VSD's. In this embodiment, independent control is provided by supplying a separate variable frequency drive 226 for each fan in the fan array 204.

Referring still to FIG. 4, the system 200 further comprises a surge controller 230. The surge controller directs the fan speed control to operate each fan unit in the fan array independently to prevent the fan units from reaching the surge point.

The surge controller 230 receives input from air flow measuring devices 232 that measure the flow upstream of the fans 204 and from a pressure sensor 234 that measures the pressure upstream and downstream of the fans 204 and determines the pressure differential. In combination, the surge controller 230, the airflow sensor 232, and fan pressure sensor 234 form a fan control system 236. The fan control system 236 with the fan array 204 in the air handler 202 form a fan system 238.

The surge controller 230 receives input from the pressure sensor 224 in the duct system 212 and outputs signals to the fan speed controllers 226 to control the operation of each fan accordingly. The surge controller 230 turns off each of the fan units 204 independently by signaling the fan speed controllers 226, or by interrupting the control signal from the duct pressure controller 224 so that the interrupted signal causes that individual speed controller to drive the speed of that fan unit to zero.

Preferably, the surge controller 230 comprises a general purpose computer or microprocessor programmed to perform the calculations described herein. Generally, the controller repeatedly computes how close the fan array is to its surge point and whether to turn on or turn off a fan to maintain the fan array within maximum operating range. One preferred method for controlling the fan array is described in more detail below.

Figure 5:
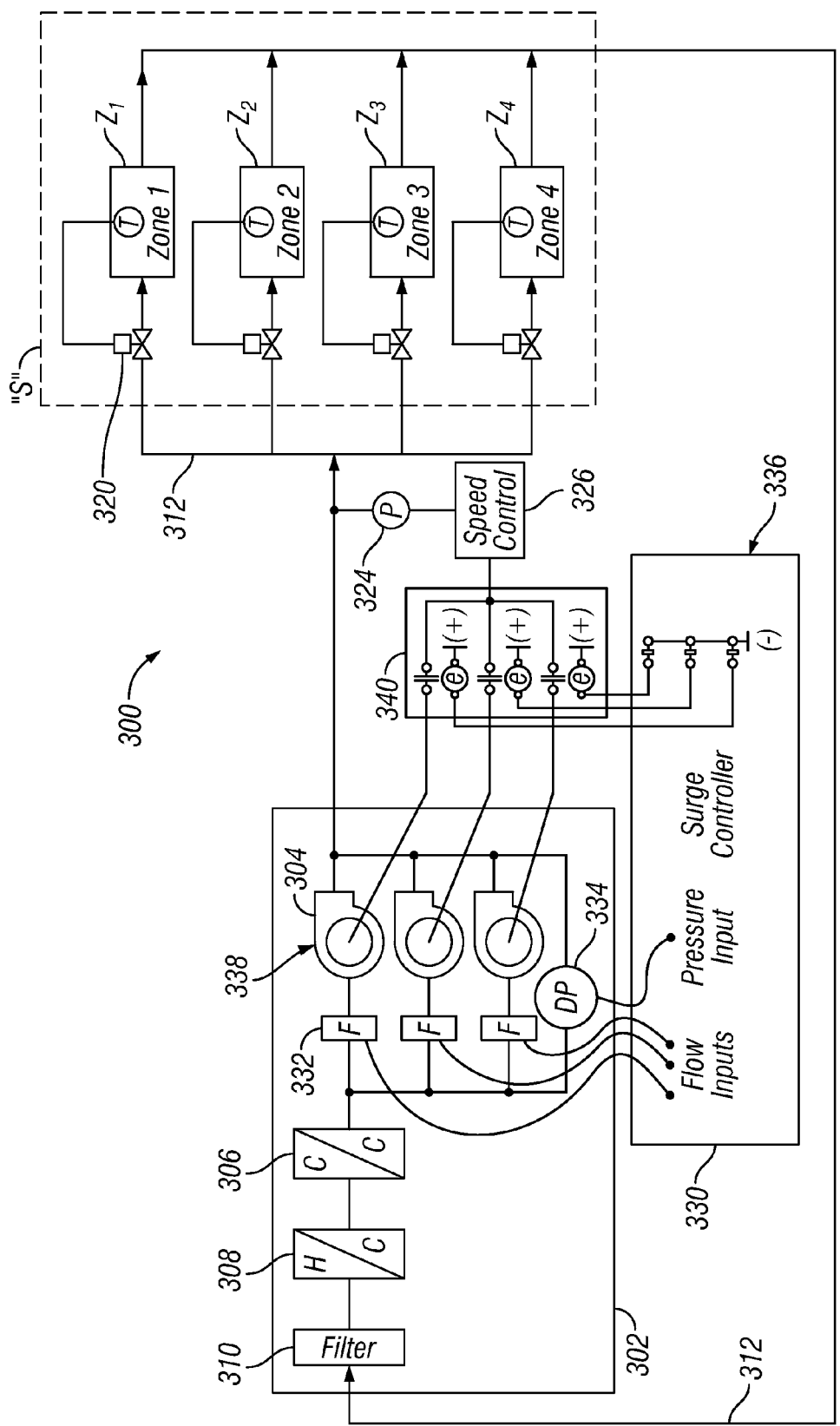
FIG. 5 is a schematic illustration of a variable air volume air handler system for a multi-zone structure comprising a fan system made in accordance with a second preferred embodiment of the present invention.

An alternate embodiment of the present invention is shown in FIG. 5. In this embodiment, the system 300 is similar to the system 200 in FIG. 4, in that it comprises an air handler 302 housing an array of fans 304, and may include other components, such as cooling coils 306, heating coils 308, and filters 310, as well as dampers, louvers, and other items not shown. A system of distribution ducts 312 channels air to and from each zone $Z_1$ to $Z_4$ Each zone is equipped with a variable air volume box 320 with a damper is installed.

The system 300 preferably also comprises a pressure controller 324 and one speed controller 326. The fan system 338 comprises a fan control system 336 that includes a surge controller 330, airflow measuring devices 332, and a fan pressure sensor 334. In this embodiment, the one speed controller 326 drives all of the fan units 304 at the same speed. The system includes a power distribution panel with relays that can selectively turn power on and off to each fan unit in response to input from the surge controller 330.

As indicated previously, the preferred fan speed controllers 226, 326 are variable frequency drives. However, a variable frequency drive is not the only method of speed control contemplated by this invention. Rather, the term "speed controller" includes all types of speed control systems used with electric motors, including but not limited to alternating current (AC) induction motors with AC inverter drives, shunt wound or permanent magnet direct current (DC) motors with pulse width modulated DC drives, switched reluctance motors with asymmetric bridge converter drives, and AC permanent magnet motors with AC inverter drives.

Figure 6:
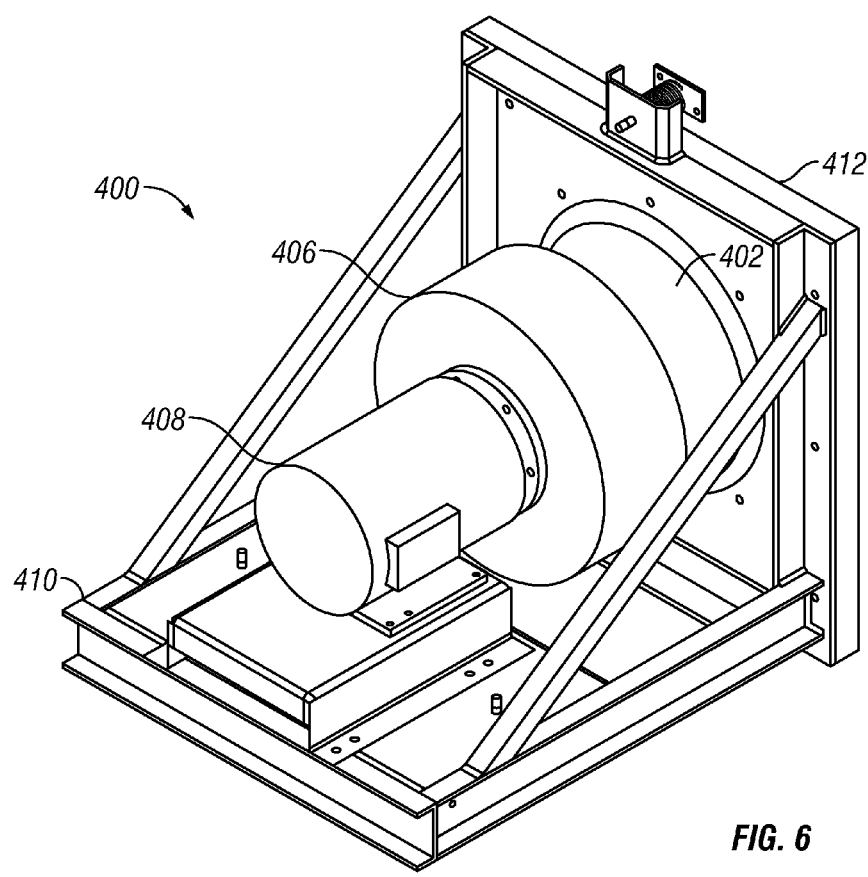
FIG. 6 is a rear perspective view of a conventional plenum fan ideal for use in the fan system of the present invention.

In most instances, the fans used in the fan arrays 204 and 304 will be plenum fans. A typical plenum fan is shown in FIG. 6 and designated generally by the reference numeral 400. The fan 400 comprises an inlet cone 402, a rotating centrifugal fan wheel 406 and an electric motor 408 directly coupled to the fan wheel. These components are supported by a mounting frame 410, and a back plate 412. While plenum fans are preferred, the invention is not so limited. The systems of the present invention may use other types of fans and motors. For example, the inventive systems may use fans that are coupled to the drive motor through drive belts, chains or gears.

Figure 7:
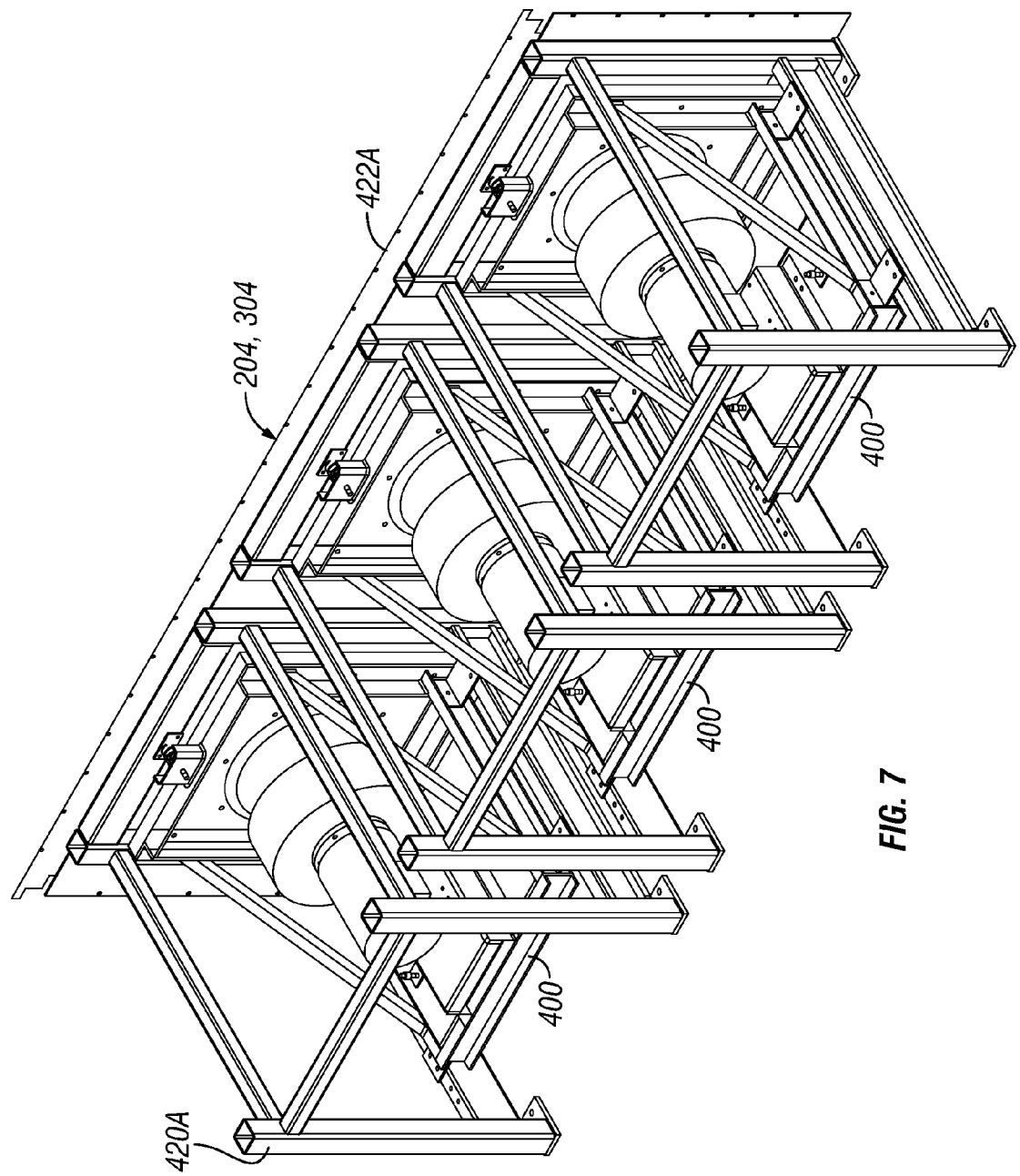
FIG. 7 shows a plurality of fan units comprising three fan units arranged side by side in one row.
Figure 8:
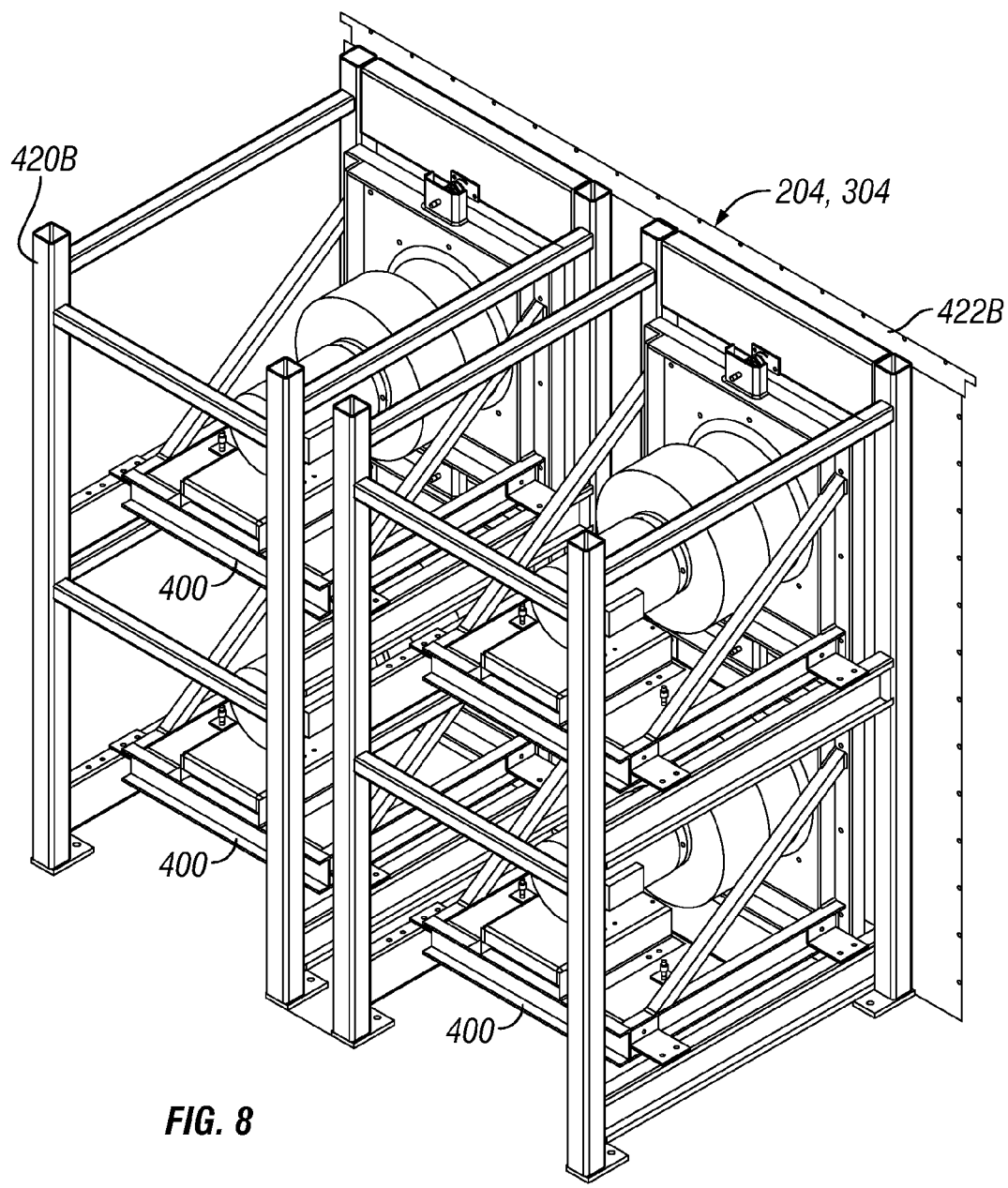
FIG. 8 shows a plurality of fan units comprising four fan units arranged in two rows of two with the fan units in the upper row aligned with the fan units in the bottom row.
Figure 9:
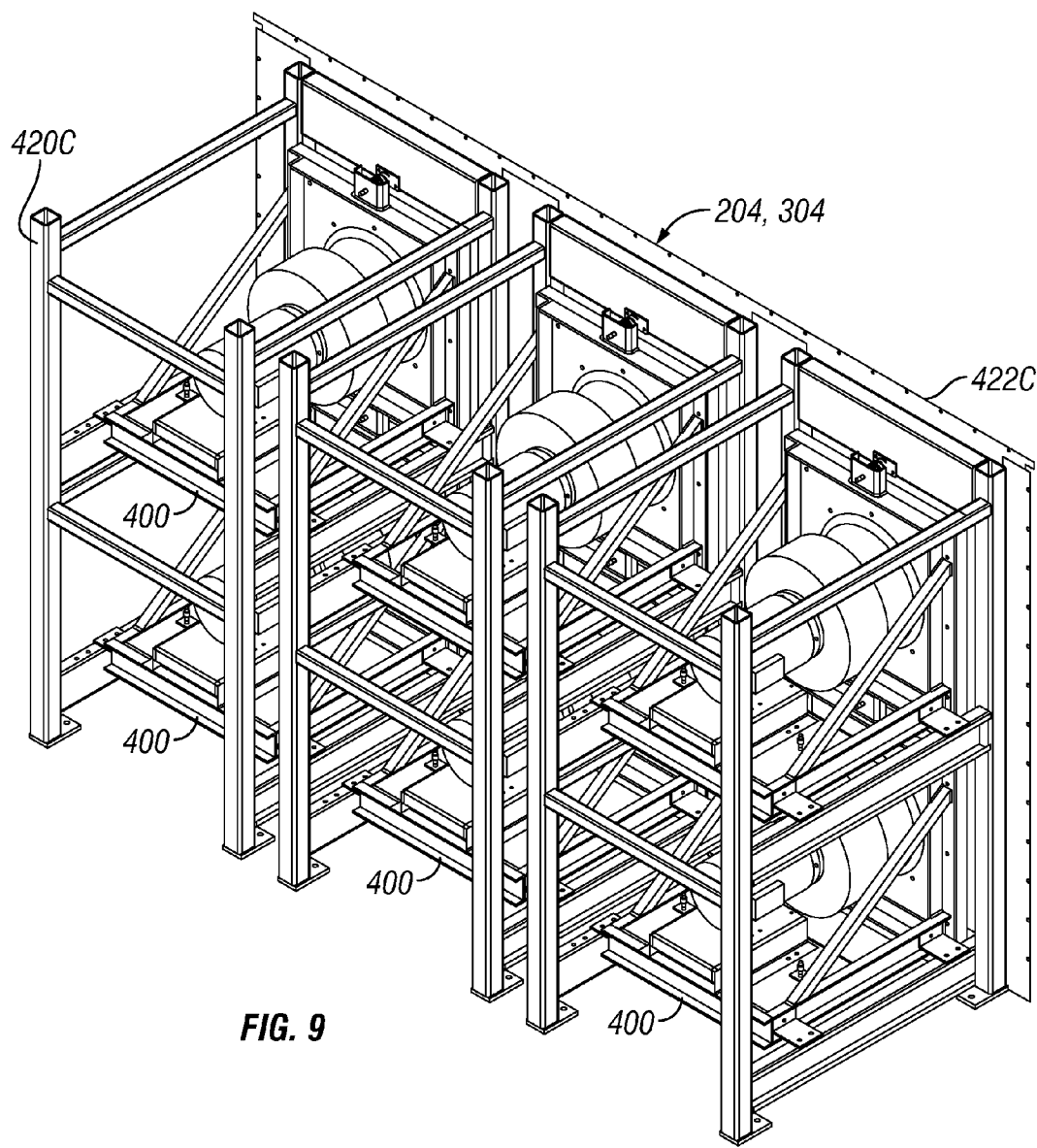
FIG. 9 shows a plurality of fan units comprising six fan units arranged in two rows of three with the fan units in the upper row aligned with the fan units in the bottom row.

As indicated, the fan system of the present invention comprises a plurality of fans arranged in a fan array. Examples of suitable fan array configurations are illustrated in FIGS. 7-9. The fan array 204, 304 may be a single row of fans 400, such as a row of three fans arranged 1 high by 3 wide in a support frame 420A, as seen in FIG. 7. The support frame 420A preferably is attached to the floor of the air handler 202, 302. An air seal wall 422A positioned across the front of the fan units 400 separates the inlet plenum of the fan array from the outlet plenum.

Alternately, the fan array 204, 304 may comprises a plurality of rows and a plurality of columns, such as a 4-fan array arranged 2 high by 2 wide in a support frame 420B with an air seal wall 422B, as shown in FIG. 8. FIG. 9 shows yet another example of a fan array, specifically, a 6-fan array arranged 2 high by 3 wide in a support frame 420C and air seal wall 422C. Although all the examples of multi-row arrays shown herein have the fans units 400 aligned vertically and horizontally, this is not essential. The rows may be staggered or offset from one another.

The fan units 400 employed in the fan arrays 204, 304 also may include a back flow prevention device. Referring now to FIGS. 10A, 10B, 11A, and 11B, a preferred back flow prevention assembly will be described. The backflow prevention assembly 500 preferably comprises a disk 502 mounted on a shaft 504. The shaft 504 is slidably supported in a bearing support 506. The bearing support comprises a tube 508 supported in a frame 510 that is bolted or otherwise fixed to the fan mounting frame 410. Bearings 514 (FIGS. 11A & 11B) in the tube 508 allow the shaft 504 to move back and forth inside the fan wheel housing. In this way, the disk 502 can slide in and out of the rotating fan wheel.

Figure 10A:
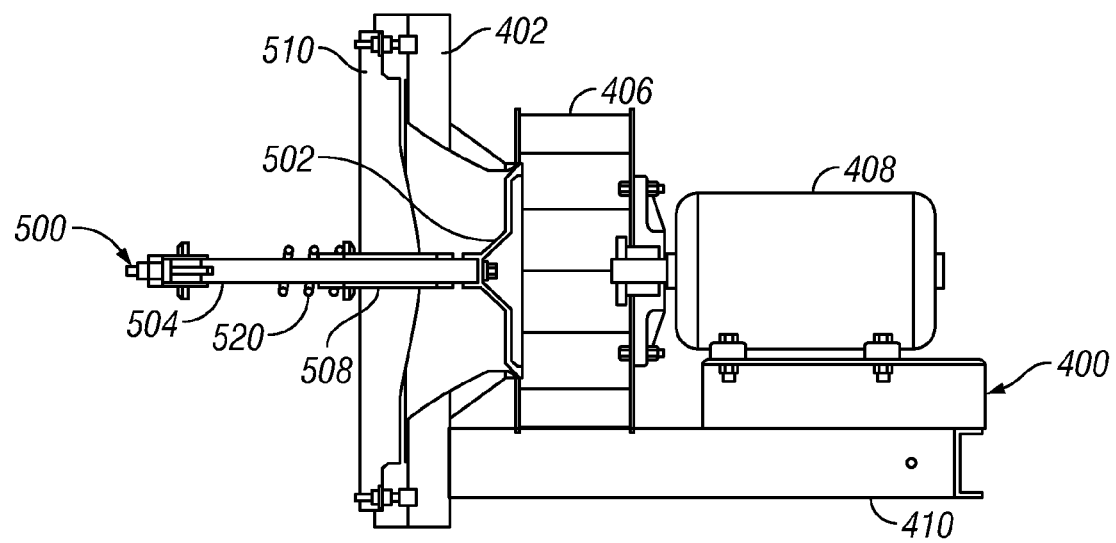
FIGS. 10A and 10B show the retracted and extended positions, respectively, of a preferred backflow prevent comprising a disk.
Figure 10B:
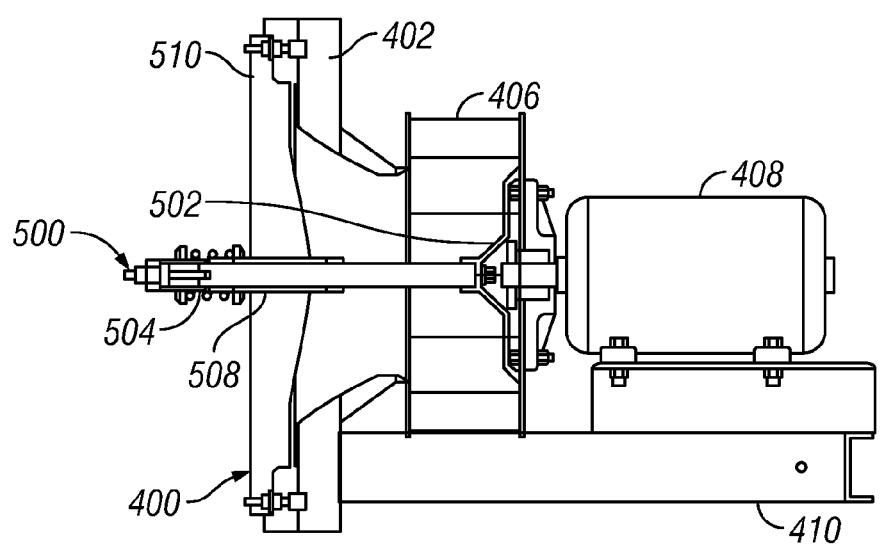
Figure 11A:
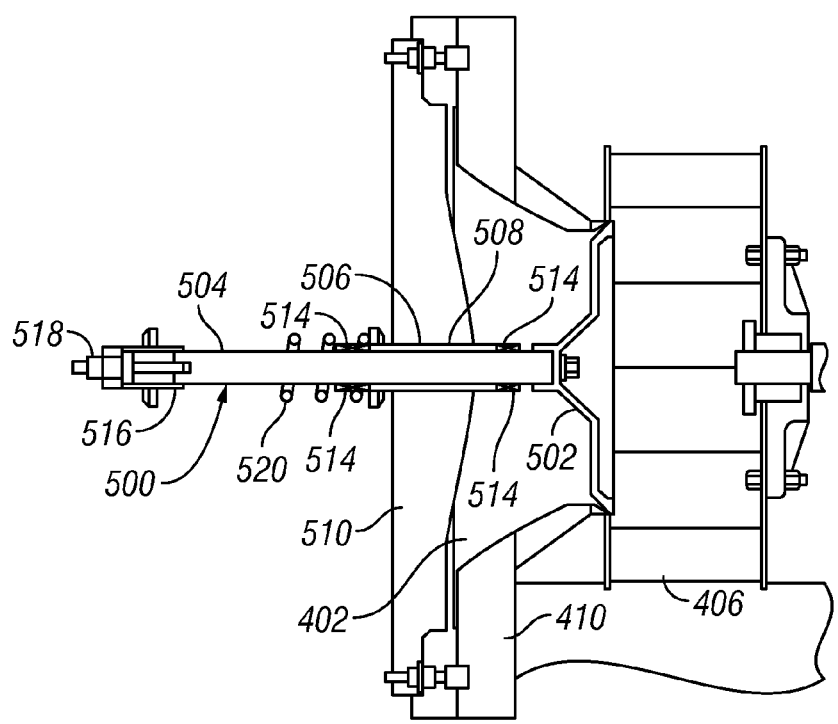
FIGS. 11A and 11B show enlarged fragmented views of the retracted and extended positions shown in FIGS. 10A and 10B, respectively.
Figure 11B:
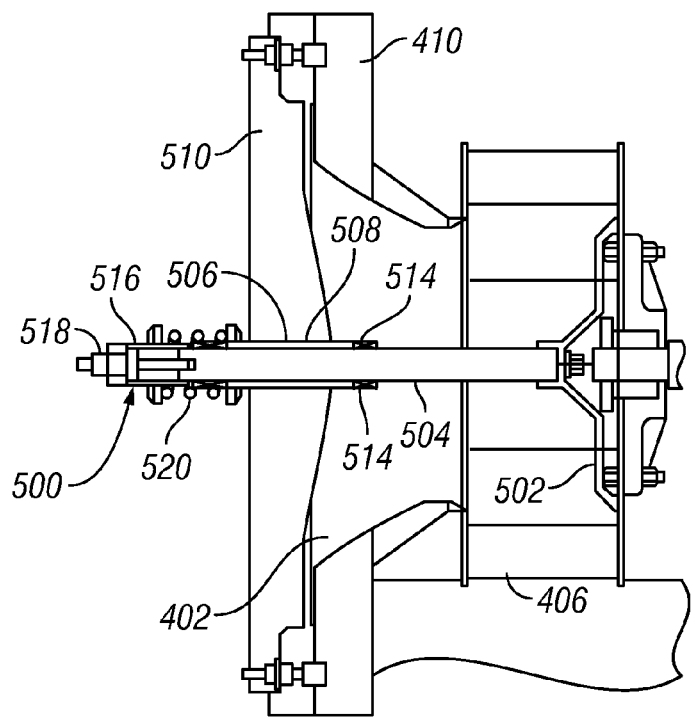

The disk 502 does not rotate with the fan wheel 406, but rather slides from the point where it is in contact with the inlet cone 402 (FIGS. 10A & 11A) to the back plate of the fan wheel 406 (FIGS. 10B & 11B). A stop, such as the end cap 516 (FIGS. 11A & 11B), limits the distance that the shaft 504 can travel forward (to the right in the drawings) thereby preventing the disk 502 from touching the rotating wheel. Preferably, the end cap 516 is movable on the shaft 504 using an adjustment nut 518. Backward movement of the disk (to the left in the drawings) is limited by contact with the edge of the cone 402.

Now it will be apparent that forward airflow through the fan when it is operating drives the disk toward the open position (FIGS. 10B & 11B) and that backward air flow through the fan when the fan is not operating drives the disk toward the closed position (FIGS. 10A &11A). The disk 502 is shaped to provide the minimum obstruction to flow when it is fully extended in the fan wheel 406, as seen on the right in FIGS. 10B and 11B.

When the fan unit 400 is operating, the velocity pressure from the air entering through the inlet cone 402 forces the disk 502 to its fully extended or open position where it provides minimum obstruction to airflow (FIGS. 10B & 11B). When the fan unit 400 is switched off and other fan units in the array 204, 304 are operating, the back flow through the fan from the air delivered by the operating fan units drives the disk 502 to the fully retracted position or closed, as seen in FIGS. 10A and 11A, where it is held against the rim of the inlet cone 402 by the pressure difference between the inlet and outlet of the non-operating fan(s) created by the fan units that are operating.

The backflow preventer assembly 500 may include a biasing member, such as the spring 520. The spring is configured so as to be slightly compressed when the disk is advanced to its forwardmost position, so as to provide tension back toward the closed position. This ensures that the disk 502 will move away from the back plate of the fan wheel 406 as soon as there is a reduction in air flow through the fan, allowing the disk to be impacted by backflow of air. When the disk 502 is fully retracted against the inner rim of the inlet cone 402, it seals off the air passage from the inlet to the outlet thereby preventing back flow through the fan.

As an alternative to a biasing device, the back flow assembly 500 may include a mechanical actuator that can be used to drive the disk 502 between the fully extended and fully retracted positions. The mechanical actuator can be a pressure-operated cylinder or an electric motor-operated linear actuator that can drive the disk without the aid of airflow or pressure generated by the operating fan units.

The disk type back flow prevention assembly is preferred because this type of device is known to have little or no effect on the performance of the fan unit when it is in the fully extended position. They can be made to shut off very tightly so there is almost no air recirculation through the fan when shut off. This improves the efficiency of the fan array by reducing the amount of air the operating fan units are required to deliver.

Other types of backflow prevention assemblies, such as back draft dampers or isolation dampers on the inlet or outlet of the fan, can also be used. These devices are well know to those skilled in the art of fan and air handler design so they will not be described in detail here.

In the preferred embodiment, the fan airflow sensor 232, 332 is a pressure sensor on each fan unit that measures the pressure depression from the inlet of the fan to the narrowest diameter of the inlet cone. This pressure difference is well known to be predictive of the airflow through the fan unit. Thus, the surge controller 230, 330 can be programmed to calculate the flow through the individual fan units, and then to sum the flow from each of the fan units to determine the total flow of the plurality of fans.

Other airflow measurement devices can be used, such as velocity measurement grids, air pressure drop measurements through components correlated to known airflow, or air velocity probes on the inlet or outlets of the fan units. Regardless of the mechanism employed, the air flow measurement device preferably is able to measure or accurately calculate the total airflow delivered by all of the operating fan units.

Having described its components, the operation of the fan control system 236 now will be explained. The airflow from the flow measurement device 232, 332 and the pressure rise across the plurality of fan units 204, 304 from the fan pressure sensor 234, 334 is input to the surge controller 230, 330. The number of fan units and the surge constant, $K_s$, is known for each of the fans. The surge controller 230, 330 keeps track of the number of fan units 204, 304 running. Using the surge constant, $K_s$, the total airflow of the fan units, the pressure rise "ΔP" across the fan units, and the number of operating fans units "N", the surge controller 230, 330 calculates when the operating fan units are approaching the surge point by using the following equation:

$$\text{Surge Pressure} = K_s \times (\text{Total Airflow/Number of fans running})^2$$

As the flow decreases, the calculated surge pressure will decrease as well, and it will approach the measured pressure rise across the fans. When the calculated surge pressure is close to the pressure rise across the fan units, a fan is shut off. The surge controller 230, 330 then allows some time for the fans units that remain operating to stabilize. During this stabilization period, the supply duct static pressure controller 224, 324 will cause the fan speed controller(s) 240, 340 to increase the speed of the operating fan units 204, 304 to compensate for the reduction of one (1) operating fan unit. The air flow will stabilize at close to the operating point before the reduction in operating fan units occurred. After stabilization, the calculation of the surge pressure resumes. If the airflow continues to fall, additional fan units are shut down using this process until only one fan unit remains operating.

On rising airflow, the surge controller 230, 330 calculates what the Surge Pressure would be if an additional fan unit were operating by using the following equation:

$$\text{Surge Pressure+1} = K_s \times (\text{Total Airflow/(Number of fans running+1)})^2$$

When this calculated value is above the measured pressure rise across the fans, the surge controller 230, 330 turns on an additional fan unit 204, 304. A period for stabilization follows as the duct static pressure controller 224, 324 causes the speed controller(s) 226, 326 to decrease the speed of the fan units 204, 304 to compensate for an additional fan unit running. After this period of stabilization, the value for Surge Pressure+1 is calculated. If the airflow continues to rise, additional fan units are turned on using this process until all fan units are operating. The stabilization times and the offsets between the calculated surge values and the turn-on and turn-off differential thresholds may be predetermined but preferably are adjustable on the surge controller to promote stable operation over a variety of different systems and operating conditions.

Figure 12:
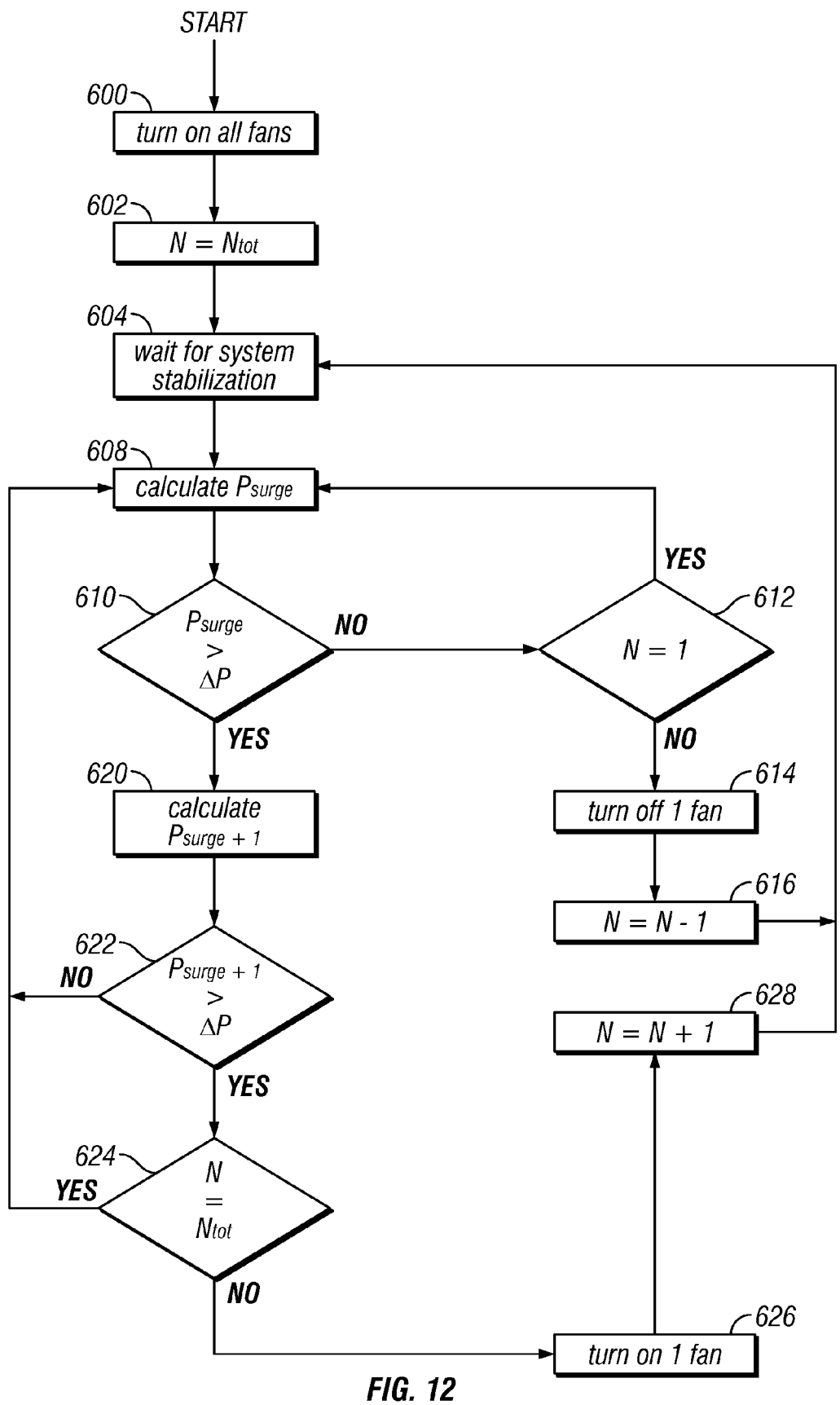
FIG. 12 is a flow chart illustrating the operation of the controller.

The operation of the controller is illustrated in the flow chart of FIG. 12, to which attention now is directed. The following are applied:

$Q$=Fan array airflow $\Delta P$=Fan Array Pressure Rise

The known values are:

$N_{tot}$=total number of fans in the array $K_s$=surge constant for the fans in the array The calculations employed are:

$N$=number of fans currently running $P_{surge}$=Surge Pressure=$K_s \times (Q/N)^2$ $P_{surge+1} = K_s \times (Q/(N+1))^2$ At system "Start" 600, all fans 602 are turned on 604 and the counter is set to N=$N_{tot}$ at 602. After a preset stabilization period 604, Surge Pressure ($P_{surge}$) is calculated at 608. This calculated value is compared to the pressure rise (ΔP) at 610 to determine if Surge Pressure ($P_{surge}$) if greater than the pressure rise (ΔP).

If "no," then the controller determines if only one (1) fan is presently running, that is, if N=1. If "yes," that is, if only one (1) fan is running, then no further action to avoid surge is possible and the loop is repeated beginning at 608 with recalculating Surge Pressure ($P_{surge}$). If "no," the controller turns off one fan at 614 and resets the value of N (currently running fans) to N=N−1 at 616. Then, the loop is repeated beginning at 608 with recalculating Surge Pressure ($P_{surge}$). One less fan running causes a decrease in airflow which in turn results in the fan speed control increasing the speed of the fans that are still running to maintain the setting in the zones.

If the calculated Surge Pressure ($P_{surge}$) is greater than the pressure rise (ΔP) at 610, the surge controller determines if the number of running fans can be increased by calculating what the Surge Pressure would be if an additional fan is turned on ($P_{surge+1}$) at 620 and comparing this value to the pressure rise (ΔP) at 622. If the Surge Pressure with another fan running is not greater than the pressure rise (ΔP), then the loop is repeated beginning at 608 with recalculating Surge Pressure ($P_{surge}$).

If the Surge Pressure at 608 is greater than the pressure rise (ΔP) at 610, then the surge controller calculates what the Surge Pressure would be if an additional fan were operating ($P_{surge+1}$) at 620. This calculated value is compared to the pressure rise at 622. If the calculated Surge Pressure with the additional fan ($P_{surge+1}$) is equal to or less than the pressure rise (ΔP), the surge controller continues to repeat the loop beginning at step 608. If the calculated Surge Pressure with the additional fan ($P_{surge+1}$) is greater than the pressure rise (ΔP), the surge controller then determines if there is a fan available to turn on, that is, whether all the fans are presently running or if N=$N_{tot}$ at 624. If the answer to this is "yes," then no further action to turn on fans is possible and the loop is repeated beginning at 608 with recalculating Surge Pressure ($P_{surge}$).

If less than all the fans are running, then the surge controller turns on one additional fan at 626 and resets the counter to N=N+1 at 628. Then, the process repeats beginning with calculating Surge Pressure ($P_{surge}$) at 608. The air flow from the additional fan will cause the fan speed controller to reduce the speed of the fans to maintain the desired setting in the various zones.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. A fan system for a variable air volume air handling system that supplies conditioned air to a structure having multiple zones, wherein the air handling system includes a duct system for distributing air output from the fan system to each of the zones, a duct pressure sensor, and at least one fan speed control responsive to the duct pressure sensor to maintain a desired system pressure, the fan system comprising:

a fan array comprising a plurality of independently controllable fan units configured to operate in parallel to blow air through the duct system, wherein each of the fan units comprises a backflow preventer;

an automatic fan control system comprising:

a fan pressure sensor for determining the pressure rise across the plurality of fan units;

a fan airflow sensor for determining the total air flow generated by the plurality of fan units; and a surge controller adapted to receive input from the fan pressure sensor and the fan airflow sensor, to determine the on-off status of each of the fan units in the fan array, and in response to the fan pressure and airflow input to decrease the number of fan units in the fan array that is operating and to increase the speed of the remaining fan units to prevent the fan array from reaching the surge point.

2. The fan system of claim 1 wherein each of the fan units is a plenum fan.

3. The fan system of claim 2 wherein the backflow preventer in each of the plurality of fan units comprises a disk supported for movement between a closed position in which the disk blocks air from flowing through the fan unit and an open position in which the disk allows maximum air to flow through the fan unit.

4. The fan system of claim 3 wherein movement of the disk is driven by air flow so that forward airflow through the fan when it is operating drives the disk toward the open position and so that backward air flow through the fan when the fan is not operating drives the disk toward the closed position.

5. The fan system of claim 4 wherein the backflow preventer comprises means for biasing the disk toward the closed position.

6. The fan system of claim 5 wherein the biasing means is a spring.

7. The fan system of claim 1 wherein the at least one fan speed control is a variable speed drive.

8. The fan system of claim 1 wherein the at least one fan speed control comprises a plurality of fan speed controls including a fan speed control for each of the fan units in the fan array.

9. The fan system of claim 1 wherein the at least one fan speed control comprises a single fan speed control for the fan array.

10. The fan system of claim 9 wherein the fan control system further comprises an assembly of switches comprising a switch for each fan unit in the fan array, each such switch connected to selectively turn power on and off to each fan unit in response to input from the surge controller.

11. The fan system of claim 1 wherein the fan airflow sensor comprises a pressure sensor on each fan unit that measures the drop in pressure from the inlet of the fan to the narrowest diameter of the inlet cone, and wherein the surge controller is adapted to calculate the flow through each of the fan units in the fan array and then to calculate therefrom the total flow of the fan array.

12. An air handling system comprising the fan system of claim 1.

\* \* \* \* \*

UNITED STATES PATENT AND TRADEMARK OFFICE
CERTIFICATE OF CORRECTION

PATENT NO. : 9,677,782 B1  
APPLICATION NO. : 14/251620  
DATED : June 13, 2017  
INVENTOR(S) : Walter P. Mecozzi It is certified that error appears in the above-identified patent and that said Letters Patent is hereby corrected as shown below:

On the Title Page  
Abstract, Line 12: replace "control turn" with --controller turns--.

In the Specification  
Column 1, Line 49: replace "and or" with --and/or--.  
Column 2, Line 49: replace "verses" with --versus--.  
Column 2, Line 50: replace "verses" with --versus--.  
Column 5, Line 64: replace "is installed." with --installed.--.  
Column 6, Line 41: replace "comprises" with --comprise--.  
Column 6, Line 52: replace "back flow" with --backflow--.  
Column 6, Line 53: replace "back flow" with --backflow--.  
Column 7, Line 21: replace "back flow" with --backflow--.  
Column 7, Line 38: replace "back flow" with --backflow--.  
Column 7, Line 39: replace "back flow" with --backflow--.  
Column 7, Line 46: replace "back flow" with --backflow--.  
Column 7, Line 56: replace "know" with --known--.  
Column 8, Line 30: replace "fans" with --fan--.  
Column 8, Line 36: replace "occurred" with --occurs--.  
Column 9, Line 67: replace "inventions" with --invention--.  
Column 10, Line 4: replace "inventions" with --invention--.

Signed and Sealed this  
Twenty-second Day of August, 2017

Joseph Matal  
*Performing the Functions and Duties of the*  
*Under Secretary of Commerce for Intellectual Property and*  
*Director of the United States Patent and Trademark Office*